United States Patent [19]

Smythe et al.

[11] Patent Number: 4,509,858
[45] Date of Patent: Apr. 9, 1985

[54] COMPACT, LINEAR MEASUREMENT INTERFEROMETER WITH ZERO ABBE ERROR

[75] Inventors: Robert A. Smythe, Pittsford; Joachim Bunkenburg, Victor; Gunnar D. Richardson, Fairport, all of N.Y.

[73] Assignee: GCA Corporation/Tropel Division, Fairport, N.Y.

[21] Appl. No.: 458,709

[22] Filed: Jan. 17, 1983

[51] Int. Cl.³ .............................................. G01B 9/02
[52] U.S. Cl. .................................................. 356/358
[58] Field of Search ............................... 356/357, 358

[56] References Cited

U.S. PATENT DOCUMENTS 3,791,739  2/1974  Kawasaki ........................... 356/358
3,884,580  5/1975  Webster et al. ..................... 356/358
3,975,100  8/1976  Taylor ................................ 356/358
3,976,379  8/1976  Morokuma ......................... 356/357

OTHER PUBLICATIONS

"Laser Transducer Systems for High Accuracy Machine Positioning", by Andre F. Rude & Michael J. Ward, 1976, Hewlett-Packard Company.

Primary Examiner—Davis L. Willis
Assistant Examiner—Matthew W. Koren
Attorney, Agent, or Firm—Stonebraker, Shepard & Stephens

[57] ABSTRACT

A linear measurement interferometer 10 with a measurement axis directed toward a surface of a work piece 17 has a light source 11, a detection system 12, and a beam splitter 13 arranged to divide light from the source into test beams 21, 22, and 34 and reference beams 23, 24, and 33 that travel test and reference paths and recombine for detection by the detection system. Beam splitter 13 is arranged on the measurement axis with the work piece surface on one side of the beam splitter and the test beam path straddling the measurement axis on the opposite side of the beam splitter. A test beam retroreflector 25 mounted in the test path on the measurement axis reflects back the test beam from beam splitter 13 and is movable along the measurement axis without causing abbe error. A probe or focusing lens 15 movable along the measurement axis for measuring the work piece surface is interconnected with the test beam retroreflector 25 for movement together to determine a distance moved in measuring the work piece surface. A preferred way of arranging beam splitter 13 on the measurement axis while accommodating a probe is to bore a central aperture 20 in the beam splitter allowing the probe to pass through the beam splitter.

14 Claims, 10 Drawing Figures

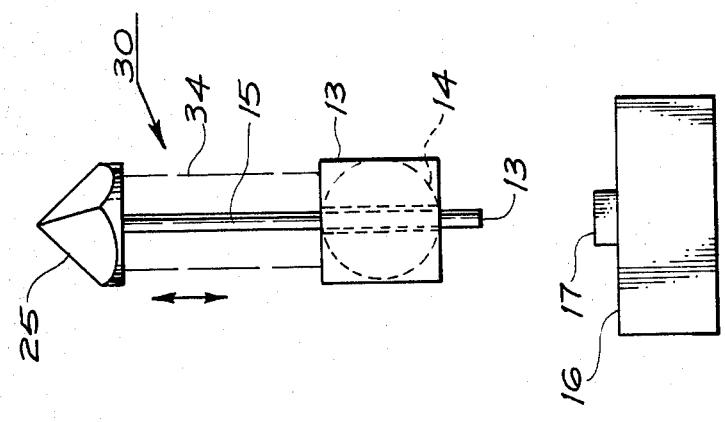
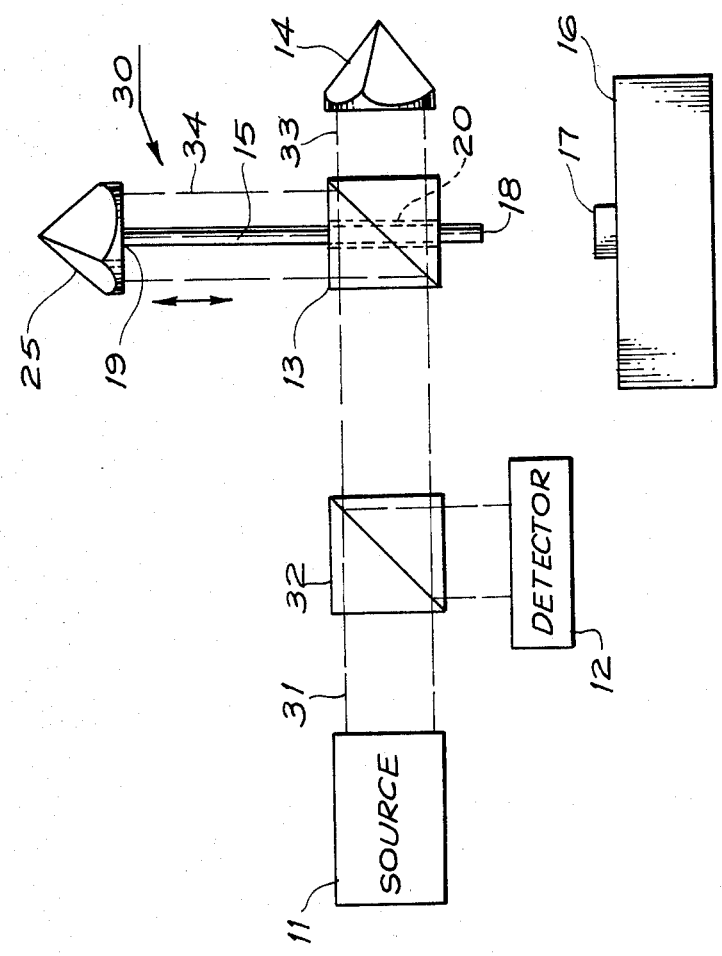

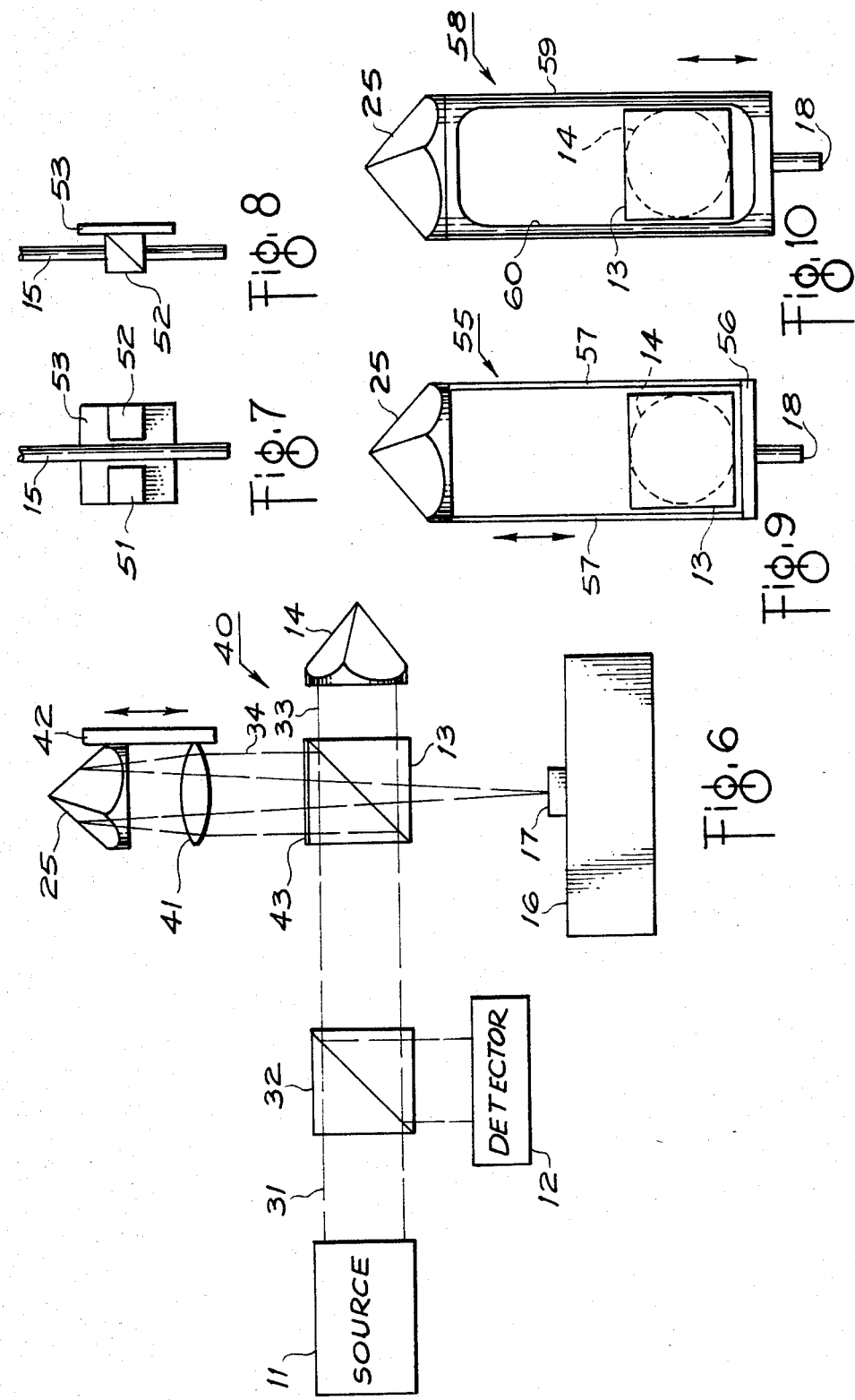

COMPACT, LINEAR MEASUREMENT INTERFEROMETER WITH ZERO ABBE ERROR

BACKGROUND

This invention arose from frustrating inaccuracies inherent in prior art linear measurement interferometers. Although optical and electronic components in interferometers can function at a high level of precision, mechanical systems in prior art instruments considerably reduce the potential accuracy.

We have discovered a better way of arranging the elements and components of an interferometer to accomplish linear measurement with zero abbe error and an overall accuracy improvement over the prior art on the order of a factor of 10. Our interferometer is not only more accurate for several reasons, but is also compact, easily packaged and set up for operation, and adequately rugged so that it can measure accurately for a long time.

SUMMARY OF THE INVENTION

We have discovered a way of folding the test beam path of a linear measurement interferometer to extend along and straddle the measurement axis along which a probe or focusing lens moves for respectively accomplishing contact or non-contact linear measurement. Our arrangement has several advantages that include greater mechanical stability, zero abbe error, reduced problems with thermal expansion and contraction, a shorter dead air path, a dead air path proportional to the distance being measured, and a more compact and convenient instrument.

Our invention applies to an interferometer having a light source, a detection system, a beam splitter arranged to divide light from the source into test and reference beams that travel test and reference paths and recombine for detection by the detection system. Our interferometer has a measurement axis directed toward a surface of a work piece, and the beam splitter is arranged on the measurement axis with the work piece surface on one side of the beam splitter and the test beam path straddling the measurement axis on the opposite side of the beam splitter. A reference beam retroreflector in the reference path reflects back the reference beam from the beam splitter.

We mount a test beam retroreflector in the test path on the measurement axis for reflecting back the test beam from the beam splitter without causing abbe error. We make the test beam retroreflector movable along the measurement axis with a measuring means such as a probe or focusing lens that also moves along the measurement axis for measuring the work piece surface. We connect the test beam retroreflector to the probe or lens so that they move together to determine a distance moved in measuring the work piece surface. We prefer boring a central hole through the beam splitter so the beam splitter can surround the probe axis and let the probe move through the beam splitter.

DRAWINGS

FIGS. 4 and 5 are schematic diagrams of an alternative to the interferometer of FIGS. 1-3, shown respectively in front and side views;

FIG. 6 is a schematic diagram of another alternative to the interferometer of FIGS. 1-3 arranged for non-contact measurement and shown in side view;

FIGS. 7 and 8 are respective front and side views of an alternative beam splitter usable in the interferometers of FIGS. 1-5; and FIGS. 9 and 10 are schematic front views of alternative configurations of probes usable in the interferometers of FIGS. 1-5.

DETAILED DESCRIPTION

Previous linear measurement interferometers, such as the Hewlett-Packard instrument shown in a disclosure filed with this application, have used a test beam path remote from the contact end of a linearly movable probe. The test beam path extended from the remote end of the probe away from the work piece being measured, partly because of unobstructed space available beyond the remote end of the probe. This required optical components mounted at great distances from the work pieces being measured, and this led to mechanical instability and inaccuracies from thermal expansion and contraction of mounts or supports. It also produced a dead air gap inversely proportional to the distance measured so that the smallest measurements were afflicted with the largest dead air gap inaccuracies. This arrangement also led to widely spaced apart optical components that were difficult to package and install.

In trying to overcome inaccuracies inherent in remote test beam paths for linear measurement, we considered a test beam path offset from and parallel with the measurement axis along which a probe moved. This allowed a beam splitter to be placed near the work piece surface and direct a test beam adjacent the path of probe travel. Abbe error inaccuracies proved sufficient to defeat such an arrangement, however.

Then we discovered the inventive way of making the test beam path straddle the measurement axis occupied by the probe to eliminate abbe error. We also found ways of arranging the optical and mechanical components to achieve great stability and minimize errors from thermal expansion and contraction. Our interferometer's dead air path is proportional to the distance being measured. These improvements give our overall instrument an accuracy of three parts per million. Our instrument is also compact and easily packaged into a small unit that can be placed on a measuring table and operated without installation work. The way these advantages are accomplished is explained below.

Figure 2:
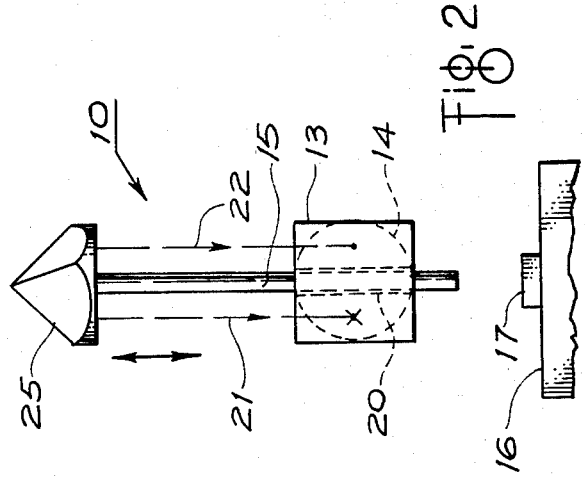
FIGS. 1-3 are schematic views of a preferred embodiment of our linear measurement interferometer shown respectively in front, side, and top views.
Figure 3:
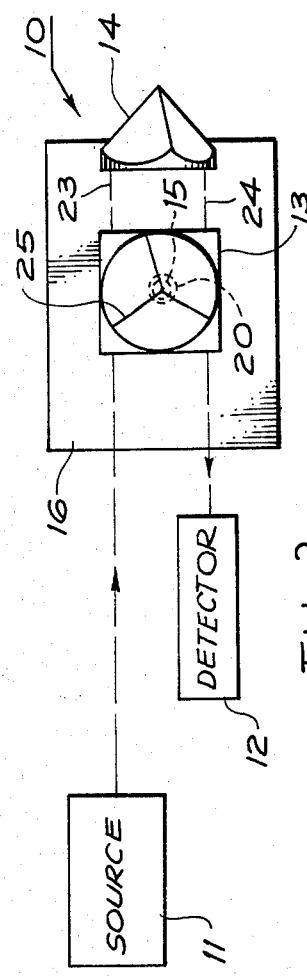
Figure 1:
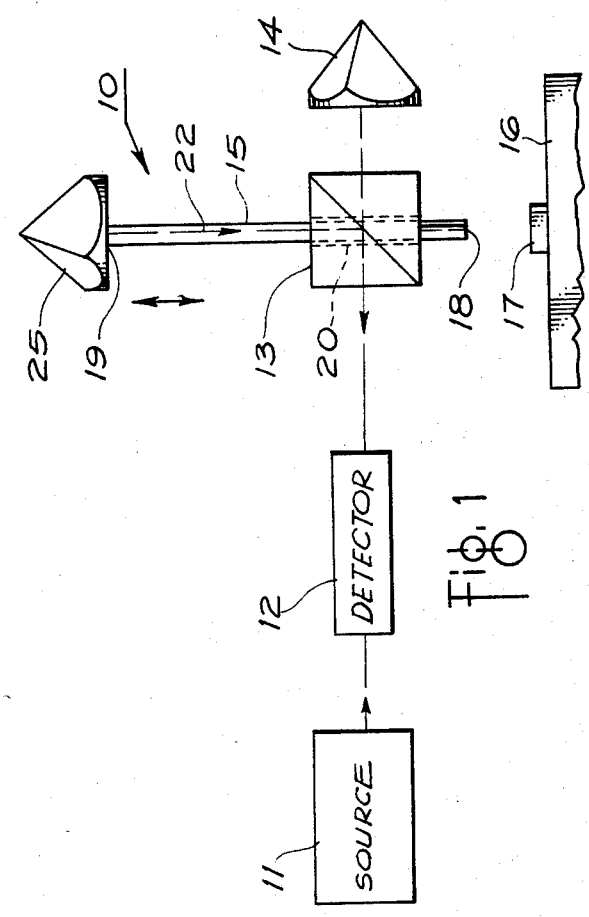

Interferometer 10 is schematically illustrated in FIGS. 1-3 so that known details do not clutter the essential operation. The known components essential for understanding the operation of interferometer 10 include a light source 11, a detector or detection system 12, a retroreflector 14 in the reference beam path, and a linearly movable probe 15. Instrument 10 is stably mounted above measuring table 16 holding work piece 17. Probe 15, with its contact end 18 for engaging a surface of work piece 17 and its remote end 19 opposite from contact end 18, moves up and down the measurement axis relative to table 16. A multitude of mounts, supports, clamps, guides, and other structures (not shown) are generally available for arranging the components of instrument 10 in their illustrated positions allowing accurate motion of probe 15.

Instead of a test beam path extending beyond remote end 19 away from work piece 17, we provide polarizing beam splitter 13 with a central aperature 20 through which probe 15 can move so that beam splitter 13 can surround the measurement axis and be arranged near contact end 18 of probe 15. Beam splitter 13 divides light from source 11 between test and reference beams and directs the test beam along the measurement axis occupied by probe 15 to a test beam retroreflector 25 mounted on remote end 19 of probe 15.

As best shown in FIG. 2, the test beam path straddles probe 15 between beam splitter 13 and retroreflector 25. Part of the light from source 11 incident on beam splitter 13 is reflected upward in a test beam 21 to retroreflector 25 that offsets and reflects a test beam 22 back to beam splitter 13. The portion of light passing straight through polarizing beam splitter 13 as reference beam 23 is also offset and reflected back by retroreflector 14 as a reference beam 24 that merges with test beam 22 at beam splitter 23. The combined test and reference beams proceed from there to detector 12 that can use several known ways of processing the interferring beams to produce meaningful and accurate measuring information.

Source 11, detector 12, beam splitter 13, and retroreflector 14 can all be mounted on a base (not shown) that is sturdily positioned over measuring table 16 and spaced only far enough from table 16 to allow an adequate range of measurement. This minimizes thermal expansion and contraction and makes base mounting of most of the instrument's components practical, rugged, and accurate. Movable probe 15 can have a conventional clamp holder mounted on guides (not shown) for accurately moving probe 15 up and down relative to work piece 17. Also, instrument 10 can have its measurement axis oriented horizontally or at some angle other than vertical.

Beam splitter 13 surrounds the measurement axis occupied by probe 15 and this puts test beams 21 and 22 in a plane through the measurement axis as viewed in FIG. 1. In a transverse plane as viewed in FIG. 2, test beams 21 and 22 are offset from the measurement axis of probe 15. This does not produce the usual abbe error, because beams 21 and 22 are equally offset on opposite sides of the axis of probe 15 so that offset error applied to one beam has an opposite application to the other beam and automatically cancels out. Also, a probe is satisfactory with a diameter as small as 6 or 7 millimeters so that beams 21 and 22 need an offset from the measurement axis of only about 4 or 5 millimeters. Retroreflector 25 is wider than probe 15 so as to receive and reflect test beams 21 and 22 along opposite sides of probe 15. Slight angular errors in retroreflectors 25 and 14 do not disturb the accuracy of instrument 10, and the known ability of retroreflectors to reflect a beam offset and parallel with the incident beam cooperates with probe 15 and a test beam path accurately straddling the probe axis.

Contact end 18 of probe 15 can be zeroed on measuring table 16, and its movements thereafter in reaching a surface of work piece 17 can be determined by interference fringes processed by detector 12. Systems for accomplishing this are generally known and can be applied to instrument 10.

Instrument 30 of FIGS. 4 and 5 is similar to instrument 10 except for having a larger diameter light beam 31, an extra non-polarizing beam splitter 32, and a different position for detector 12. The larger light beam 31 illuminates a large area of polarizing beam splitter 13 and, besides producing a conventional reference beam 33, produces a wide test beam 34 straddling probe 15 on the measurement axis. Probe 15, in passing through aperature 20 in beam splitter 13, casts a shadow in test beam 34 that becomes U-shaped around probe 15. Any off-axis abbe error on one side of test beam 34 causes an automatically correcting error on the opposite side of the measuring axis so that the instrument is substantially free of abbe error.

Instrument 40 of FIG. 6 illustrates a way of applying the invention to non-contact measurement. Source 11 producing a large beam 31 divided by a non-polarizing beam splitter 32 from which an output signal is directed to detector 12 are all similar to the configuration shown in FIG. 4. Polarizing beam splitter 13 is arranged on the measuring axis as with movable probe instruments, but has no central aperature because no probe is used in instrument 40.

Test beam retroreflector 25 is interconnected with a focusing lens 41 as schematically illustrated by support 42 so that lens 41 and retroreflector 25 move together in the test beam path. This path also includes a quarter-wave plate conveniently placed on top of beam splitter 13, but quarter-wave plate 43 can also be placed on the bottom face of retroreflector 25 or even within lens 41.

Instead of a probe contacting the surface of work piece 17, focusing lens 41 focuses test beam 34 onto the surface of work piece 17; and proper focus at this point can be detected by interference fringes at detector 12. When test beam 34 is accurately focused on work piece 17 as illustrated, its divergent reflection back through beam splitter 13, lens 41, and retroreflector 25 produces an accurately plane wave front on the final pass through lens 41 to eliminate fringes when the columnar test beam 34 recombines with reference beam 33. With the focal point of the test beam off the work piece surface 17, the test beam remains either divergent or convergent on its final pass through lens 41 to produce circular fringes when interferring with the plane wave front reference beam 33.

Quarter-wave plate 43 changes the polarization orientation by 90° for each double pass of test beam 34. The first double pass of test beam 34 upward from beam splitter 13 through focusing lens 41 and back from retroreflector 25 through quarter-wave plate 43 changes the polarization orientation by 90° so that the test beam passes straight through polarizing beam splitter 13 and down to work piece 17. Movement of lens 41 and retroreflector 25 can then focus test beam 34 accurately on a specular surface of work piece 17 for a measurement.

The test beam reflected from work piece 17 passes back up through beam splitter 13 and quarter-wave plate 43 for another pass through lens 41, retroreflector 25, and back down to quarter-wave plate 43 for a second double pass that turns the polarization angle another 90° to direct the output beam from beam splitter 13 toward beam splitter 32 and detector 12. Here the test beam combines with reference beam 33 so that detector 12 can produce a measurement.

For probe versions of the invention such as shown in instruments 10 and 30, we prefer a beam splitter 13 with a central aperature 20 through which a probe can move. An alternative to this is shown in FIGS. 7 and 8 where a beam splitter is divided into two parts 51 and 52 mounted on a support 53 to straddle probe 15. It is presently mechanically more difficult to mount and align beam splitter portions 51 and 52 on support 53, but the end result is practically the same as single beam splitter 13 with its drilled aperature 20. Either way, the test beam straddles probe 15 and the measurement axis.

There are also ways to keep the test beam closer to the measurement axis by forming a probe with a central length that extends along the measurement axis in an off-axis position as shown in the alternatives of FIGS. 9 and 10. Probe 55 of FIG. 9 has a contact end 18 extending below beam splitter 13, but a central region of probe 55 from bracket 56 upward is formed of spaced apart and parallel rods 57 extending to test beam retroreflector 25.

Probe 58 of FIG. 10 has a central region formed as a hollow tube 59 having a slot 60 allowing light to enter and travel within tube 59. Beam splitter 13 is then fixed in place within tube 59, and retroreflector 25 mounts over the open upper end of tube 59. Tube 59 is movable vertically relative to beam splitter 13, and slot 60 leaves light paths unblocked at any vertical position within the range of movement of probe 58.

Many other generally known mechanical and optical expedients can be used in structuring interferometers according to the invention. The illustrated embodiments are far from exhaustive and are selected only to illustrate presently preferred alternatives. Once the basic configuration is understood, workers in the interferometry arts will probably devise other ways of implementing it.

We claim:

1. An interferometer having a light source, a detection system, a beam splitter arranged to divide light from said source into test and reference beams that travel test and reference paths and recombine for detection by said detection system, said interferometer having a measurement axis directed toward a surface of a work piece, and said interferometer comprising:
   a. said beam splitter being arranged on said measurement axis with said work piece surface on one side of said beam splitter and said test beam path straddling said measurement axis on an opposite side of said beam splitter;
   b. a reference beam retroreflector mounted in said reference path for reflecting said reference beam from said beam splitter back to said beam splitter;
   c. a test beam retroreflector mounted in said test path on said measurement axis for reflecting said test beam from said beam splitter back to said beam splitter without causing abbe error;
   d. said test beam retroreflector being movable along said measurement axis on said opposite side of said beam splitter from said work piece surface;
   e. means movable along said measurement axis for measuring said work piece surface; and
   f. said test beam retroreflector being interconnected with said measuring means and movable with said measuring means to determine a distance moved in measuring said work piece surface.

2. The interferometer of claim 1 wherein said measuring means is a probe having a contact end for engaging said work piece surface and having said test beam retroreflector mounted on an end of said probe opposite said contact end.

3. The interferometer of claim 2 wherein said beam splitter has a central aperture through which said probe moves.

4. The interferometer of claim 2 wherein said beam splitter is formed of a pair of similar beam splitters fixed to a common support mounted adjacent said probe so that said pair of beam splitters are arranged astraddle said probe.

5. The interferometer of claim 2 wherein said test beam path extends along one side of said probe from said beam splitter to said test beam retroreflector and along an opposite side of said probe from said test beam retroreflector to said beam splitter.

6. The interferometer of claim 5 wherein said beam splitter has a central aperture through which said probe moves.

7. The interferometer of claim 5 wherein said test beam retroreflector is wider than said probe.

8. The interferometer of claim 2 wherein a light beam from said source is wider than said probe and straddles said probe between said beam splitter and said test beam retroreflector.

9. The interferometer of claim 8 wherein said beam splitter has a central aperture through which said probe moves.

10. The interferometer of claim 2 wherein a central length of said probe extends along said axis in an off-axis position, and said beam splitter is arranged within said central length of said probe.

11. The interferometer of claim 10 wherein said central length of said probe is longer than a range of movement of said contact end of said probe.

12. The interferometer of claim 1 wherein said measuring means is a focusing lens arranged for focusing said test beam on said work piece surface.

13. The interferometer of claim 12 wherein said focusing lens is arranged between said beam splitter and said test beam retroflector.

14. The interferometer of claim 13 wherein said beam splitter is a polarizing beam splitter and a quarter-wave plate is arranged in said test beam path.

* * * * *